(12) United States Patent
Lin et al.

(10) Patent No.: US 12,491,736 B2
(45) Date of Patent: Dec. 9, 2025

(54) INNER LINER WITH IMPROVED PERMEABILITY PROPERTIES

(71) Applicant: Compagnie Generale Des Etablissements Michelin, Clermont-Ferrand (FR)

(72) Inventors: Tingdong Lin, Greenville, SC (US); Constantine Khripin, Greenville, SC (US); Stephen Vance, Greenville, SC (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 510 days.

(21) Appl. No.: 17/789,878

(22) PCT Filed: Dec. 30, 2019

(86) PCT No.: PCT/US2019/068919
§ 371 (c)(1),
(2) Date: Jun. 29, 2022

(87) PCT Pub. No.: WO2021/137847
PCT Pub. Date: Jul. 8, 2021

(65) Prior Publication Data
US 2023/0045624 A1    Feb. 9, 2023

(51) Int. Cl.
*B60C 5/14*    (2006.01)
*B60C 1/00*    (2006.01)
*C08K 3/34*    (2006.01)

(52) U.S. Cl.
CPC .............. *B60C 1/0008* (2013.01); *B60C 5/14* (2013.01); *C08K 3/346* (2013.01); *C08K 2201/005* (2013.01)

(58) Field of Classification Search
None
See application file for complete search history.

(56) References Cited

U.S. PATENT DOCUMENTS

| | | |
|---|---|---|
| 7,875,669 B2 | 1/2011 | Miyazaki et al. |
| 9,328,213 B2 | 5/2016 | Kanou et al. |
| 2010/0331473 A1 | 12/2010 | Miyazaki |
| 2017/0137594 A1* | 5/2017 | Riou ...................... C08L 23/22 |

FOREIGN PATENT DOCUMENTS

JP    2015218321 A    12/2015

OTHER PUBLICATIONS

International Search Report and Written Opinion for PCT/US2019/068919 dated Sep. 17, 2020, 11 pages.

* cited by examiner

*Primary Examiner* — Sheeba Ahmed
(74) *Attorney, Agent, or Firm* — Dority & Manning, P.A.

(57) ABSTRACT

An inner liner for an elastomeric articles is provided. The inner liner contains platy mineral particles having a mean aspect ratio of less than three, where at least about 30% or more of the platy mineral particles have an aspect ratio of 2 or greater. Furthermore, an inflatable article, such as a tire, that includes an inner liner containing the platy mineral particles, is also provided.

18 Claims, 2 Drawing Sheets

INNER LINER WITH IMPROVED PERMEABILITY PROPERTIES

BACKGROUND OF THE INVENTION

Cross Reference to Related Applications

The present application is the national stage entry of International Patent Application No. PCT/US2019/068919 having a filing date of Dec. 30, 2019, which is incorporated herein by reference.

Various articles are constructed to hold a gas, such as air, under pressure. These articles include, for instance, tires, athletic balls such as basketballs, footballs, etc., inflatable boats, air mattresses, and the like. These articles are typically made from a polymeric material having some elastic properties. Tires, for instance, are typically made from an elastomeric rubber material, such as a styrene butadiene polymer.

Many elastomeric materials that are used to make inflatable articles may, in some circumstances, remain slightly permeable to gases such as oxygen. If left unchecked, the gas permeability of the inflated article may compromise the performance of the article and cause the article to deflate over time. Further, oxygen passing through the article can cause oxidation of the elastomers, causing deleterious effects to the properties of the elastomer. For instance, the elastomers may tend to harden and degrade.

In view of the above, tubeless inflatable articles, such as tires, typically contain an inner liner that is intended to reduce gas permeability and inhibit oxygen travel through the article. For instance, in the past, these inner liners have been made from a composition containing butyl rubber. Butyl rubber in its raw state, however, still remains somewhat gas permeable. Thus, many attempts have been made to combine butyl rubber with other materials in order to further reduce permeability. For example, attempts to improve the gas permeability of butyl rubber have involved adding a filler to the rubber material.

Currently, it is believed that filler particles with high, or even very high, aspect ratios, and/or high loading amounts of the platy filler, are necessary to improve the gas permeability properties of the inner liner. However, it has been found that even when using platy fillers with high aspect ratios and/or high loading amounts, inconsistent results are often obtained. Therefore, contrary to the present teachings and understanding, a large aspect ratio platy filler and/or high loading amount of the platy filler fails to improve gas permeability to the desired level.

As such, a need currently exists for an improved inner liner for inflatable articles, such as tires. It would be a further benefit to provide an inflatable article with an improved inner liner.

SUMMARY OF THE INVENTION

The present invention is generally directed to an inner liner for an inflatable article. The inner liner includes a rubber component, and particles of a platy mineral having a mean aspect ratio of less than three, where at least about 30% or more of the platy mineral particles have an aspect ratio of 2 or greater.

In one aspect, the platy mineral includes kaolin, and, in a further aspect, the platy mineral is kaolin. Furthermore, in an aspect, the particles of the platy mineral have a mean diameter of about 0.8 µm or greater and about 3 µm or less. Additionally or alternatively, in one aspect, the particles of the platy mineral have a mean diameter of about 0.9 µm or greater and about 2 µm or less. In a further aspect, at least about 33% or more of the platy mineral particles have an aspect ratio of 2 or greater, and, in one aspect, the particles of the platy mineral have a mean area of greater than about 0.4 µm². Furthermore, in an additional aspect, the particles of the platy mineral have a mean area of greater than about 0.45 µm².

Nonetheless, in one aspect, the rubber component is present in the inner liner in an amount of 100 parts per hundred rubber (phr), and the particles of the platy mineral are present in an amount of about 10 to about 50 phr. In a further aspect, the inner liner further includes at least one additive, preferably wherein the at least one additive includes carbon black. Additionally or alternatively, the at least one additive is present in the inner liner in an amount of about 10 phr to about 60 phr. In yet a further aspect, the rubber component includes a butyl rubber, a nitrile rubber, or a combination thereof. Furthermore, in one aspect, the butyl rubber is present in the rubber composition in an amount of about 50 phr to about 100 phr and/or the nitrile rubber is present in the rubber component in an amount of about 0 phr to about 50 phr.

In one aspect, an inner liner according to the present disclosure exhibits a MOCON value of about 165 or less.

Moreover, in an aspect, the present disclosure is also generally directed to a tire that includes an inner liner according to the present disclosure.

The present disclosure is also generally directed to an inflatable article that includes an inner liner. The inner liner has a rubber component and particles of a platy mineral having a mean aspect ratio of less than three, where at least about 30% or more of the platy mineral particles have an aspect ratio of 2 or greater.

In one aspect, the inflatable article has platy mineral particles, where the platy mineral includes kaolin, or, in one aspect, is kaolin. Further, in an aspect, the particles of the platy mineral have a mean diameter of about 0.8 µm or greater and about 3 µm or less. Additionally or alternatively, in an aspect, the particles of the platy mineral have a mean diameter of about 0.9 µm or greater and about 2 µm or less. Furthermore, in one aspect, at least about 33% or more of the platy mineral particles have an aspect ratio of 2 or greater. In yet a further aspect, the particles of the platy mineral have a mean area of greater than about 0.4 µm². However, in one aspect, the particles of the platy mineral have a mean area of greater than about 0.45 µm².

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DEFINITIONS

Figure 1:
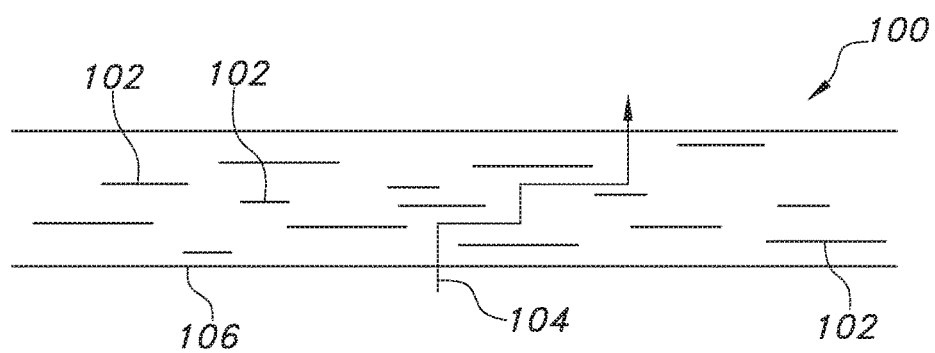
FIG. 1 is a diagram of an inner liner according to the present disclosure.

As used herein, the terms "about," "approximately," or "generally," when used to modify a value, indicates that the value can be raised or lowered by 10% and remain within the disclosed embodiment, and in one aspect may be raised or lowered by 5%, such as about 2.5%, or such as 1%, and remain within the present disclosure.

The term "phr" means parts per hundred parts of rubber. Thus, in one aspect, components of an inner liner described herein are measured relative to the total of all of the rubber components, which will be described in greater detail herein. The total phr or parts for all rubber components, whether one, two, three, or more different rubber components when present in a given recipe, is always defined as 100 phr. All other non-rubber components are ratioed against the 100 parts of rubber and are expressed in phr.

"Substantially free" of a particular component in reference to a composition is defined to mean that the particular component is contained in the composition in an amount of about 1% by weight or less or about 1 phr or less, such as about 0.5% or less or about 0.5 phr or less, or such as about 0.25% by weight or less or about 0.25 phr or less of the component in the composition, or such as about 0.1% or less or about 0.1 phr or less of the component in the composition.

DETAILED DESCRIPTION OF THE INVENTION

It is to be understood by one of ordinary skill in the art that the present discussion is a description of exemplary embodiments only, and is not intended as limiting the broader aspects of the present invention.

In general, the present disclosure is directed to an inner liner for an inflatable elastomeric article that is intended to hold a pressurized gas, that exhibits improved permeability properties. For instance, the present disclosure has found that an inner liner that includes a platy mineral exhibits improved permeability properties (e.g. a lower permeability to gas) when a high proportion of the platy mineral particles in the inner liner have an aspect ratio of about two or greater, even when the platy mineral particles in the inner liner have a mean aspect ratio of less than three. Particularly, the present disclosure has found that, contrary to prior belief, an inner liner including a platy mineral having a high aspect ratio of three or greater is not necessary for improved barrier properties. Furthermore, in one aspect, the present disclosure has found that platy mineral particles that have both a high proportion of particles with an aspect ratio of about two or greater, and a large mean diameter, such as about 0.8 µm or greater, may shower further improvements in permeability properties, particularly compared to samples formed from platy mineral particles having an aspect ratio of three or greater, and which do not have the discussed aspect ratio distribution and/or average diameter. Particularly, the present disclosure has found that the ability of the platy mineral to withstand the inner liner formation process, such that a large proportion of the surviving platy mineral particles have an aspect ratio of about two or greater while also having a mean aspect ratio of less than three, allows the inner liner to exhibit excellent permeability properties, and particularly, improvements over inner liners formed from high aspect ratio particles alone. Furthermore, when incorporated into an inflatable article, the inner liner not only improves the performance of the article by inhibiting gases from leaking out of the article, but also serves to protect the article from, for instance, oxidation due to oxygen migration.

Thus, in one aspect, the platy mineral particles may be formed from a mineral that exhibits a large degree of shearing into further platy particles instead of yielding a large portion of particles by compressive type break-down into spherical or nodular particles during inner liner processing. Of course, it should by understood that a platy mineral according to the present disclosure may still form some spherical or nodular particles upon processing, but may generally form a high proportion of platy particles. For instance, in one aspect, the platy mineral particles in the inner liner (e.g. after processing to form the inner liner) may have a mean aspect ratio of less than three, where about 20% or more of the particles have an aspect ratio of greater than 2, such as about 25% or more, such as about 30% or more, such as about 35% or more, such as about 40% or more, such as about 45% or more, such as about 50% or more, such as about 55% or more, such as about 60% or more, such as about 65% or more, such as about 70% or more, such as about 75% or more, such as about 80% or more, such as about 85% or more, such as about 90% or more, such as about 95% or more, such as up to about 100% of the particles have an aspect ratio of greater than 2.

Additionally or alternatively, in one aspect, the platy mineral particles have a mean aspect ratio in the inner liner (e.g. after processing to form the inner liner) of about 1.25 or greater, such as about 1.5 or greater, such as about 1.75 or greater, such as about 2 or greater, such as about 2.25 or greater, such as about 2.5 or greater, such as about 2.75 or greater, or such as less 3, such as about 2.95 or less, such as about 2.9 or less, such as about 2.85 or less, such as about 2.8 or less, such as about 2.7 or less, such as about 2.6 or less, such as about 2.5 or less, such as about 2.4 or less, such as about 2.3 or less, such as about 2.2 or less, such as about 2.1 or less, or any ranges or values therebetween.

For instance, referring to FIG. 1A, and as discussed above, one way to reduce the permeability of a barrier 100 layer is to fill it with plate-like materials 102 which increase the path length 104 the air molecules must diffuse to flow through the liner. Therefore, as discussed above, in one aspect, the present disclosure has found that a platy mineral that has a high proportion of platy mineral particles with an aspect ratio of about two or greater after processing, shows an excellent reduction in the permeability of the inner liner, and does not require particles having a very high aspect ratio of three or greater.

Figure 2:
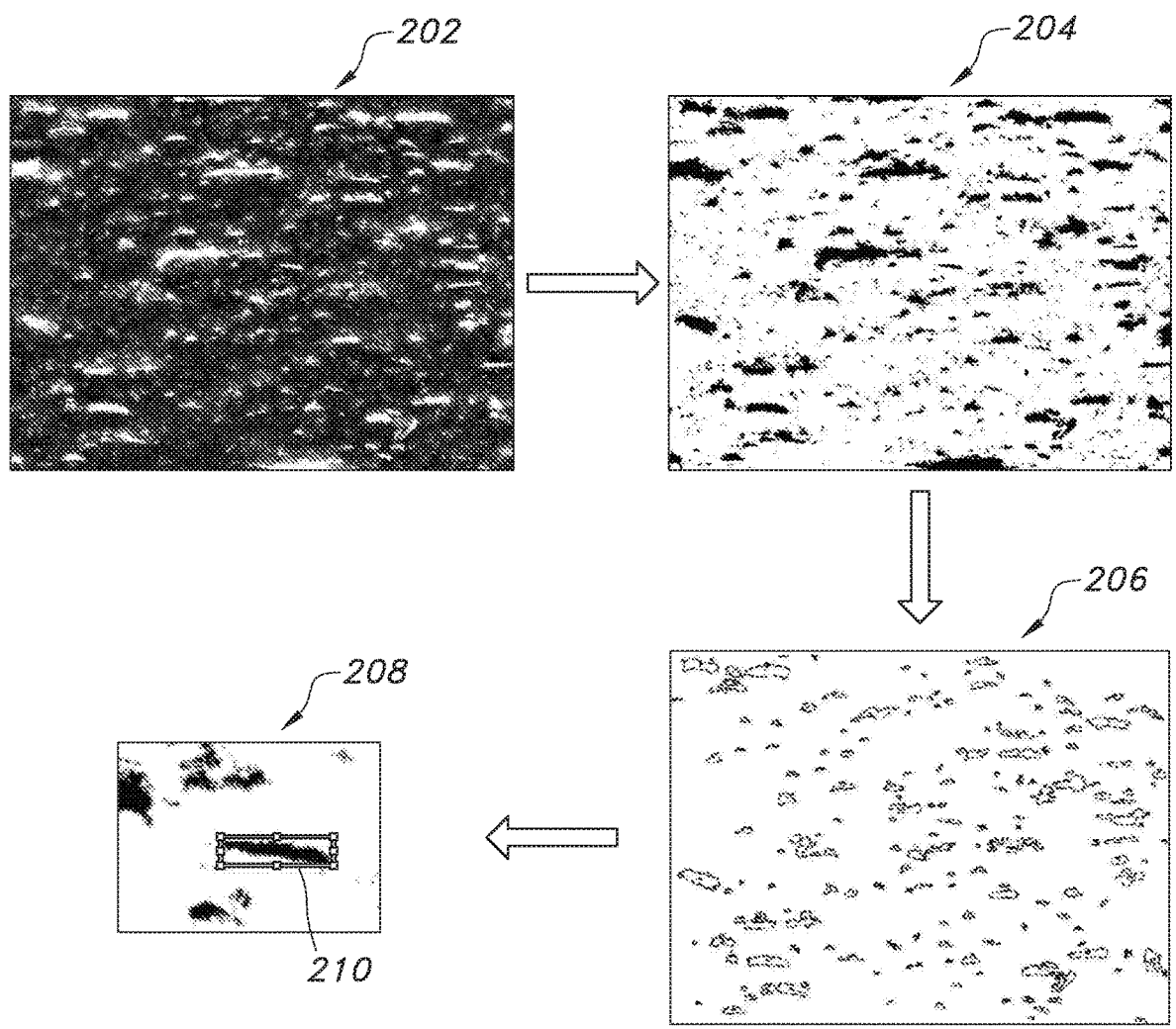
FIG. 2 is a diagram illustrating a method according to the present disclosure.

Furthermore, referring generally to FIG. 2, the present disclosure also includes a method of identifying an aspect ratio of a platy particle incorporated into an inner liner. In one aspect, either an inner liner or an inflatable article containing an inner liner according to the present disclosure is cut in a direction parallel to the flow of air. In other words, it is cut perpendicular to the inner surface of the inflatable article or inner liner. The part of the sample closest to the inner surface of the inflatable article/inner liner is referred to as the "bottom" of the sample, and the part of the sample closest to the exterior of the inflatable article/inner liner is the "top". These "bottom" and "top" labels are used to orient the sample and the image, which is important as platy mineral particles according to the present disclosure align during processing of the inner liner.

Next, the sample is imaged using a scanning electron microscope, for example STEM, JEOL JSM-7100F, using 10 kV acceleration voltage and a magnification of 2000×. The image is oriented such that the bottom of the image coincides with the bottom of the sample. Thus air would flow from the bottom of the image to the top, and the platy mineral particles are aligned parallel to the bottom of the image.

The image is analyzed using ImageJ (Rasband, W. S., ImageJ, U.S. National Institutes of Health, Bethesda, Maryland, USA, https://imagej.nih.gov/ij/, 1997-2018) using the following procedure:

1. The global scale is set using the "Set Scale" command and the scale bar in the SEM image.
2. The original image file is trimmed to remove the legend. It is then smoothed using the "Smooth" command to yield an image such as shown by reference character 202.
3. The image is converted from a grayscale image to a binary image using ImageJ "Threshold" command, converting pixel values between X and 255 to 0 and all others to 1, as generally shown by reference character 204. X is chosen such that the total area % of the particles equals the volume percentage of kaolin in the mix, for example 10%.
4. The "Set Measurements . . . " command is used to set measurements to "Area" and "Bounding Rectangle" (e.g. a bounding rectangle 210 such as shown in image 208), the latter consisting of "Width" and "Height".
5. The "Analyze Particles" command is used to automatically tabulate measurements for all particles with area 0.1 µm-Infinity. The program produces particle outlines shown in 206. The following measurements are extracted:
    a. "Aspect Ratio" (or "AR"), defined as "Width"/"Height"
    b. "% AR>2", defined as percent of all particles which have an aspect ratio greater than two
    c. "Diameter" is the average geometric diameter of all particles with aspect ratio greater than two, 2*sqrt ("Area"/π).

Thus, in one aspect of the present disclosure, the aspect ratio measurements are determined based upon the above process, and particularly, the bounding rectangle, and do not rely upon a laser diameter measurement of the particles. Furthermore, as shown in FIG. 1A, in an aspect, at least a portion of the particles have a longest dimension perpendicular to the flow of air or parallel to an inner surface 106 of the inner liner 100. Therefore, in such an aspect, the bounding rectangle may have a width perpendicular to the flow of air or parallel to an inner surface 106 of the inner liner. In a further aspect, at least about 50% of the bounding rectangles used to measure the aspect ratio (AR) have a width perpendicular to the flow of air or parallel to an inner surface 106 of the inner liner, such as at least about 60%, such as at least about 70%, such as at least about 80%, such as at least about 90% of the bounding rectangles have a width perpendicular to the flow of air or parallel to an inner surface 106 of the inner liner, and, in one aspect, substantially all of the bounding rectangles have a width perpendicular to the flow of air or parallel to an inner surface 106 of the inner liner, thus, the particles of the platy mineral may also have an orientation such that the longest dimension is perpendicular to the flow of air according to the percentages discussed in regards to the bounding rectangle.

Furthermore, the mineral particles according to the present disclosure may have a mean particle diameter (e.g. width according to the bounding rectangle method above) in the inner liner (e.g. after inner liner formation) of about 0.8 µm or greater, such as about 0.82 µm or greater, such as about 0.85 µm or greater, such as about 0.87 µm or greater, such as about 0.9 µm or greater, such as about 0.92 µm or greater, such as about 0.95 µm or greater, such as about 0.97 µm or greater, such as about 1 µm or greater, such as about 1.2 µm or greater, such as about 1.5 µm or greater, such as about 1.8 µm or greater, such as about 2 µm or greater, or such as about 3 µm or less, such as about 2.8 µm or less, such as about 2.5 µm or less, such as about 2.2 µm or less, such as about 2 µm or less, or any ranges or values therebetween.

Additionally or alternatively, the platy mineral particles according to the present disclosure may have a mean particle area in the inner liner (e.g. after mixing) of about 0.4 µm² or greater, such as about 0.42 µm² or greater, such as about 0.45 µm² or greater, such as about 0.47 µm² or greater, such as about 0.5 µm² or greater, such as about 0.55 µm² or greater, such as about 0.6 µm² or greater, or such as less than about 1 µm², or any ranges or values therebetween.

Regardless of the aspect ratio or size selected, in one aspect, the platy mineral may be a natural mineral or a synthetic mineral. In one aspect, the platy mineral may include silicates, such as phyllosilicates. Such materials include, for instance, smectite clay minerals and various other clay materials. Particular examples include kaolin, montmorillonite such as sodium montmorillonite, magnesium montmorillonite, and calcium montmorillonite, nontronite, beidellite, volkonskoite, hectorite, laponite, sauconite, sobockite, stevensite, svinfordite, vermiculite, bentonite, and the like. Other materials that may be used include micaceous minerals such as illite and mixed layered illite/smectite minerals, such as ledikite and admixtures of illites and the clay minerals described above.

Other particles that may be suited for use in the present invention include arsonium, stibonium, selenonium, and stibonium compounds.

In one aspect, an organo modified filler may be used. For instance, an organo modified phyllosilicate may be incorporated into the composition of the present invention. In one particular embodiment, the organic structure to which the filler is associated is a surfactant. The surfactant, for instance, may be represented by the following formula:

wherein M denotes nitrogen, sulfur, phosphorous or pyridinium, and $R^1$, $R^2$ and $R^3$ independently denote hydrogen atoms, alkyl groups, aryl groups, or allyl groups, which may be the same or different.

In one particular aspect of the present disclosure, for instance, an organic modified montmorillonite based clay may be used. The montmorillonite clay may be organically modified with, for instance, dimethyl-dihydrogenated tallow-quaternary ammonium salt. An organically modified montmorillonite based clay as described above is commercially available from Southern Clay Products under the trade names CLOISITE 6A, 10A, 20A, 15A, 25A, and 30B. CLOISITE 6A, for instance, has a particle size of from about 50 to about 300 nm and contains 140 meq/100 g clay of dimethyl dihydrogenated tallow quaternary ammonium salts. In addition to dimethyl-dihydrogenated tallow-quaternary ammonium salts, in other embodiments, the clay may also be organically modified with an octadecylamine or a methyl-tallow-bis-2-hydroxyethyl quaternary ammonium salt. Still other surfactants that may be used to modify the particles include dimethyl ditallow ammonium, dipolyoxyethylene alkyl methyl ammonium, trioctyl methyl ammonium, polyoxypropylene methyl diethyl ammonium, dimethyl benzyl hydrogenated tallow quaternary ammonium, dimethyl dihydrogenated tallow quaternary ammonium, dimethyl hydrogenated tallow 2-ethylhexyl quaternary ammonium, methyl dihydrogenated tallow ammonium, and the like.

In addition to montmorillonite based clays, the platy mineral may comprise a synthetic mica, a bentonite based clay, or a silane-modified clay. Synthetic micas are commercially available from Co-Op Chemical Co., Ltd. under the trade name SOMASIF. Bentonite based clays are commercially available from Elemntis Specialties/Rheox, Inc.

under the trade name BENTONE. Permeability reducing particles edge treated with a silane coupling agent are available under the trade name NANOMER I.30PS available from Nanocor, Inc. of Arlington Heights, Illinois.

However, while any of the above platy minerals may be used, in one aspect, the platy mineral is kaolin or mica. Furthermore, in one aspect, the platy mineral is kaolin.

In addition to the above discussed aspect ratios and size ranges, the present disclosure has found that, when using a platy mineral according to the present disclosure, a high loading of the platy mineral is not required to have an inner liner that exhibits excellent permeability properties. For instance, in one aspect, the platy mineral may be included in the inner liner in an amount of about 10 phr or greater, such as about 15 phr or greater, such as about 20 phr or greater, such as about 25 phr or greater, such as about 30 phr or greater, such as about 50 phr or less, such as about 45 phr or less, such as about 40 phr or less, such as about 35 phr or less, or such as about 10 phr to about 40 phr, such as about 15 phr to about 35 phr, such as about 20 phr to about 30 phr, or any ranges or values therebetween.

Nonetheless, regardless of the platy mineral used, the composition that is used to form the inner liner of the present invention generally contains an elastomer.

The elastomer may include any suitable rubber-like material that has desired permeability characteristics. In one embodiment, for instance, the elastomer may comprise a vinyl-based polymer. For example, in one embodiment, the elastomer may be a vinyl-based polymer represented by the following general formula:

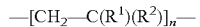

wherein $R^1$ and $R^2$ are independently hydrogen, an alkyl group, an aryl group, or an allyl group and wherein $R^1$ and $R^2$ may be the same or different.

The monomer used to form the above polymer may include, but is not limited to, ethylene, propylene, butadiene, isoprene, chloroprene, vinyl chloride, vinylidene chloride, vinyl fluoride, vinylidene fluoride, styrene, and alpha-methylstyrene.

In certain embodiments, the elastomer may have a polar functionality. For example, in one embodiment, the elastomer may be halogenated and may contain a halogen functional group such as bromine, chlorine or fluorine.

For some applications, the elastomer comprises a diene rubber. "Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a)—any homopolymer obtained by polymerisation of a conjugated diene monomer having 4 to 12 carbon atoms;

(b)—any copolymer obtained by copolymerisation of one or more dienes conjugated together or with one or more vinyl aromatic compounds having 8 to 20 carbon atoms;

(c)—a ternary copolymer obtained by copolymerisation of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d)—a copolymer of isobutene and isoprene (butyl rubber), and also the halogenated, in particular chlorinated or brominated, versions of this type of copolymer.

Suitable conjugated dienes are, in particular, 1,3-butadiene, 2-methyl-1,3-butadiene, 2,3-di(C1-C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalized with a coupling and/or starring or functionalizing agent.

Polybutadienes (PB) are suitable, and in particular those having a content of 1,2-units of between 4% and 80%, or those having a cis-1,4 content of more than 80%, polyisoprenes, butadiene-styrene copolymers, and in particular those having a styrene content of between 5% and 50% by weight and, more particularly, between 20% and 40%, a content of 1,2-bonds of the butadiene part of between 4% and 65%, and a content of trans-1,4 bonds of between 20% and 80%, butadiene-isoprene copolymers and in particular those having an isoprene content of between 5% and 90% by weight and a glass transition temperature ("Tg" measured according to ASTM D3418-82) of −40° C. to −80° C., isoprene-styrene copolymers and in particular those having a styrene content of between 5% and 50% by weight and a Tg of between −25° C. and −50° C.

In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene part of between 4% and 85%, a content of trans-1,4 units of the butadiene part of between 6% and 80%, a content of 1,2- plus 3,4-units of the isoprene part of between 5% and 70%, and a content of trans-1,4 units of the isoprene part of between 10% and 50%, and more generally any butadiene-styrene-isoprene copolymer having a Tg of between −20° C. and −70° C.

In a further aspect, the elastomer may include a nitrile rubber, such as a nitrile-butadiene rubber. The nitrile-butadiene rubber is defined as a copolymer based on at least one butadiene monomer and a nitrile monomer, i.e. a monomer bearing a nitrile function. In one aspect, the butadiene content in the nitrile-butadiene rubber is about 40% to about 90%, such as about 45% to about 85%, such as about 50 to about 80% by weight of the copolymer. Butadiene monomers which are suitable are in particular 1,3-butadiene, 2,3-dimethyl-1,3-butadiene, 2-methyl-I, 3-butadiene, 2-ethyl-I, 3-butadiene, 2-phenyl-1,3-butadiene, or mixtures of these dienes. Among these conjugated dienes are preferably used 1,3-butadiene or 2-methyl-1,3-butadiene, more preferably 1,3-butadiene. Nitrile monomers are, for example, acrylonitrile, methacrylonitrile, ethyl-acrylonitrile, crotononitrile, 2-pentenonitrile or mixtures thereof, among which acrylonitrile is preferred.

In summary, the diene elastomer may be selected from the group of highly unsaturated diene elastomers which comprises polybutadienes (BR), polyisoprenes (IR), natural rubber (NR), butadiene copolymers, isoprene copolymers and mixtures of these elastomers.

Such copolymers are selected from the group which comprises styrene-butadiene copolymers (SBR), butadiene-isoprene copolymers (BIR), isoprene-styrene copolymers (SIR) and isoprene-butadiene-styrene copolymers (SBIR).

In one particular embodiment, the elastomer comprises a styrene-butadiene rubber (SBR). The SBR may have a vinyl content of from about 11 to about 63% by weight. The glass transition temperature of SBR elastomers can range from about −20° C. to about −70° C.

In another particular embodiment, the elastomer comprises a butyl rubber. The butyl rubber may be a butylene polymer or copolymer. For instance, the butylene may be a copolymer of isobutylene and isoprene (IIR). The butyl rubber may also be halogenated as described above. For example, the butyl rubber may be brominated or chlorinated, however, it should be understood that, in one aspect, the butyl rubber is not halogenated, or is substantially free of halogen compound. Examples of halogenated butyl rubbers, when used, include brominated polyisobutylene isoprene copolymers (BIIR) or brominated isobutylene methyl styrene copolymers (BIMS). One commercially available BIMS elastomer that may be used in accordance with the present invention is EXXPRO available from the Exxon Corporation. Other commercially available butyl rubbers are available from the Bayer Chemical Corporation.

While various elastomers have been discussed in detail, in one aspect, at least a portion of the elastomer includes a butyl based rubber, such as butyl rubber or halogenated butyl rubber. Thus, in one aspect, the 100 phr of rubber includes from about 50 phr to about 100 phr of a butyl based rubber, such as about 55 phr to about 95 phr, such as about 60 phr to 90 phr, or any ranges or values therebetween. Furthermore, in one aspect, at least a portion of the elastomer includes a nitrile rubber, such as a nitrile-butadiene rubber. Therefore, in an aspect, the 100 phr of rubber includes about 0 phr to about 50 phr of a nitrile rubber, such as about 5 phr about 45 phr, such as about 10 phr to about 40 phr, or any ranges or values therebetween.

However, in one aspect, the elastomer may be formed solely from a butyl rubber, and may be generally free of other rubbers, or alternatively, in one aspect, may contain about 90 phr of butyl rubber and about 10 phr of a nitrile rubber.

In addition to the elastomer and the platy mineral particles, the inner liner of the present disclosure can contain various other materials, such as anti-oxidants, accelerators, and processing aids. Further, various other fillers may be incorporated into the composition, such as carbon black or silicas.

For instance, in one aspect, the inner liner may contain of about 10 phr to about 60 phr carbon black, such as about 15 phr to about 55 phr, such as about 20 phr to about 50 phr, or any ranges or values therebetween.

Regardless of the elastomer and/or platy mineral particles selected, in one aspect, an inner liner according to the present disclosure may display an oxygen permeability according to MOCON testing (which is described under test methods below) of about 165 or less, such as about 160 or less, such as about 155 or less, such as about 150 or less, such as about 145 or less, such as about 140 or less, such as about 135 or less, such as about 130 or less, such as about 125 or greater, or any values or ranges therebetween. Therefore, in one aspect, an inner liner according to the present disclosure may display very good impermeability to oxygen, such as measured according to MOCON testing to be as low as about 125 to about 155 MOCON.

Furthermore, as will be discussed in greater detail in regards to the examples below, the oxygen permeability properties show an improvement over a witness without platy particles, of about 10% or greater, such as about 15% or greater, such as about 20% or greater, such as about 25% or greater, such as about 30% or greater, such as about 35% or greater, up to about 40% improvement in oxygen permeability as compared to the witness or control.

Figure 3:
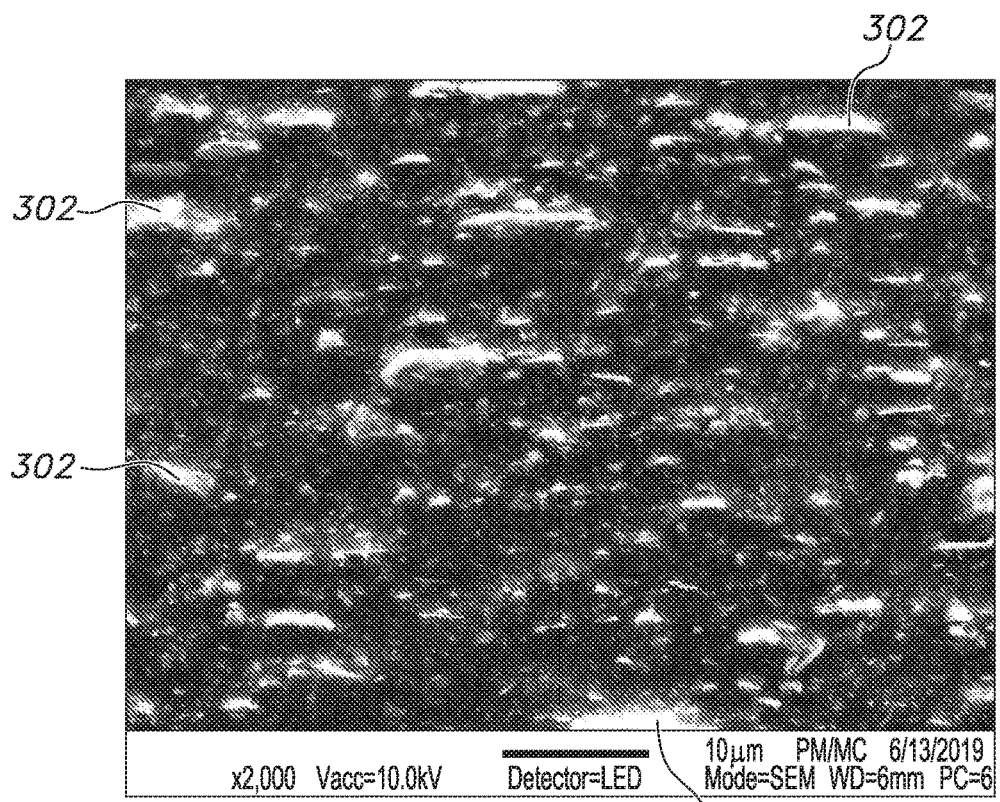
FIG. 3 is a SEM diagram of an inner liner.

In order to form an inner liner with the composition described above, the ingredients may be mixed together in a standard mixer, such as a Banbury mixer commercially available from the Farrel Corp. of Ansonia, Connecticut or a Brabender mixer commercially available from C.W. Brabender Instruments Inc. of New Jersey. During the mixing process, the platy mineral particles become intercalated and/or exfoliated in the elastomer. The exfoliation process produces a good dispersion of the platy mineral particles 302, such as shown in FIG. 3.

After mixing, the formulation may be formed into a layer or film by processes such as extrusion. The film or layer being formed may also be calendered to impart a preferred orientation to the exfoliated particles in the rubber. For instance, calendering may aid the platy mineral particles in orienting perpendicular to the direction of gas migration, further improving the permeability characteristics of the layer as discussed above.

After being formed into a film or layer or while being formed into a film or layer, the composition may then be cured in order to vulcanize the rubber. In one embodiment, the composition may be heated at about 160° C. for about 30 minutes and at about 16 bars pressure during the curing process.

Inner liners made according to the present disclosure may be incorporated into numerous articles. For example, in one embodiment, inner liners made according to the present invention may be incorporated into elastomeric articles that are intended to be inflated with a gas. In these applications, the inner liner inhibits gas flow through the wall of the article. Particular examples of articles that may incorporate an inner liner according to the present invention include sports balls such as footballs, basketballs, and the like, flotation devices such as inflatable boats, air mattresses, and the like.

In one particular embodiment, an inner liner made according to the present disclosure may be incorporated into a tire. For instance, referring to FIG. 4, a cross sectional view of a tire generally 10 is shown. The tire 10 includes a carcass 12 that defines a tread 14. The carcass 12 is made from a rubber material and, as shown, has a generally u-shaped cross section. The carcass 12 includes a first side wall 16 and a second side wall 18. The side walls 16 and 18 are connected to the tread 14 on one end and terminate at an opposite end to form a first bead 20 and a second bead 22. The beads 20 and 22 are seated in a mounting rim 24.

In order to reinforce the tire 10, the carcass 12 further includes a first bead wire 26 embedded within the first bead 20 and a second bead wire 28 embedded within the second bead 22. The bead wires 26 and 28 can be made from, for instance, metallic wires or cables. A radial carcass reinforcement 30 is wrapped around and anchored by the bead wires 26 and 28. The tire 10 further includes a crown reinforcement 32 that may comprise, for instance, a plurality of belts located below the tread 14. The crown reinforcement 32 may comprise, for instance, at least two plies of metallic wires or cables parallel to one another within each ply.

Figure 4:
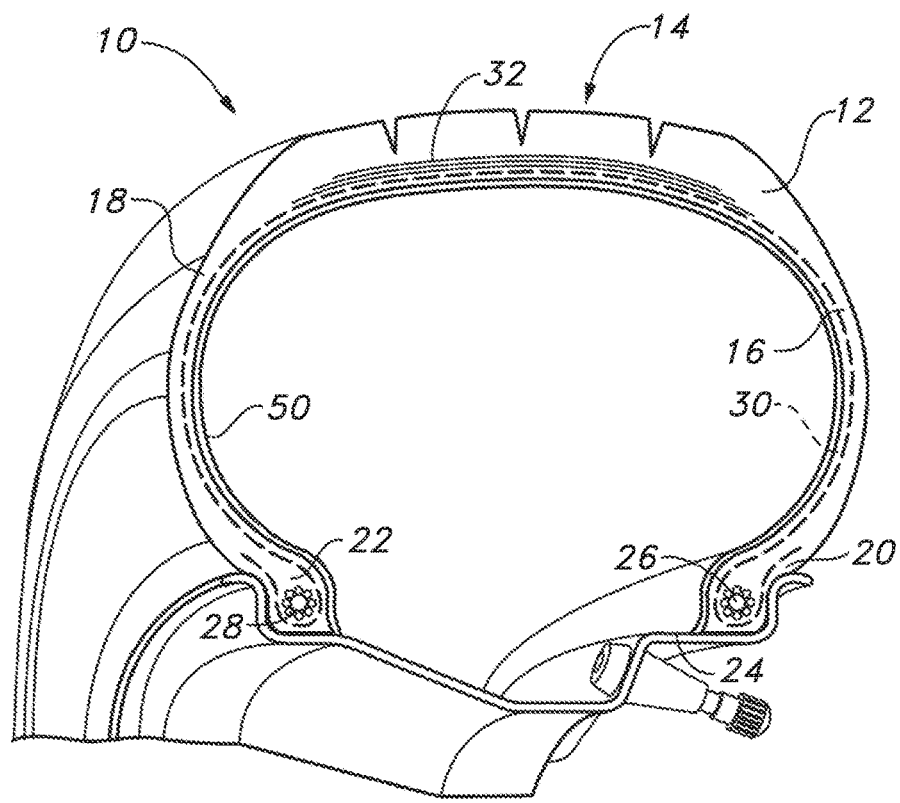
FIG. 4 is a cross sectional view of one aspect of a tire incorporating an inner liner made according to the present disclosure.

In accordance with the present disclosure, the tire 10 further includes an inner liner 50 that, in this embodiment, forms an inner lining around the interior surface of the tire. The inner liner 50 is for inhibiting pressurized gases from migrating through the walls of the tire. In accordance with the present disclosure, the inner liner 50 is made from a mixture of an elastomer and platy mineral particles. When incorporated into a tire as shown in FIG. 4, the inner liner 50 may have a thickness that varies depending upon the particular application and the type of tire being constructed. For some applications, for instance, the inner liner may have a thickness of less than about 3 mm. For instance, the inner liner may have a thickness of from about 0.1 mm to about 3 mm, such as from about 0.25 mm to about 1.5 mm. It should be understood, however, that in other embodiments, the inner liner may have a thickness greater than about 3 mm.

In the embodiment shown in FIG. 4, the inner liner 50 is positioned on the interior surface of the tire 10. It should be understood, however, that in other embodiments the inner liner may be positioned at other locations. For example, alternatively, the inner liner may be incorporated into the middle of the carcass of the tire 10.

In order to form the tire 10 as shown in FIG. 4, any number of conventional processes may be used. In general, the carcass 12 of the tire 10 is made by combining an elastomer, such as a styrene polybutadiene rubber, with various additives in a high shear mixer, such as a Banbury mixer. For example, in one embodiment, approximately 75 to 125 parts of rubber are combined with at least one reinforcing filler, such as carbon black and/or silica. For example, in one embodiment, from about 50 parts to about 70 parts of carbon black and silica are combined with the rubber.

In addition to the fillers, elemental sulfur and a plasticizer may be combined into the formulation. The sulfur may be present, for instance, in an amount from about 1 to about 15 parts by weight. The plasticizer, which may comprise a hydrocarbon oil, may be present in an amount from about 1 to about 20 parts by weight.

In addition to the above, various other minor ingredients may be contained in the formulation. For instance, typical rubber formulations further contain an accelerator, an antioxidant, and at least one tackifying resin.

After the above ingredients are mixed together, the composition is extruded into sheets and calendered. The sheets are then placed in a mold around various reinforcing elements for forming the tire.

The present disclosure may be better understood with respect to the following examples.

EXAMPLES

The following samples were formed and analyzed in order to demonstrate the benefits and advantages of inner liners made in accordance with the present disclosure.

In the examples that follow, the following test methods were used to obtain the data that is presented.

Permeability: The oxygen permeation values were measured using a MOCON OX-TRAN 2/60 permeability tester at 40° C. Cured sample disks of measured thickness (approximately 0.8-1.0 mm) were mounted on the instrument and sealed with vacuum grease. 10 psi of nitrogen was kept on one side of the disk, whereas 10 psi of an oxygen/nitrogen mixture, at a 10/90 ratio, was kept on the other side. Using a Coulox oxygen detector on the nitrogen side, the increase in oxygen concentration is monitored. Either the time required for oxygen to permeate through the disk, or for oxygen concentration on the nitrogen side to reach a constant value is recorded and used to determine the oxygen permeability.

Furthermore, unless noted otherwise (such as by notation that analysis was done by laser diameter), diameter, aspect ratio, and area measurements were obtained according to the bounding box method described above.

Example 1

In this example, the 90 phr of a butyl rubber was combined with 10 phr of a nitrile rubber to form the 100 phr of rubber. As shown in Table 1, eleven kaolin samples and one kaolin control were tested. Each kaolin sample (or the control) was combined with the elastomer in an amount of 30 phr, and formed into inner liners according to the following process:

The components were mixed in a GK 4 (4 liter) Banbury mixer. Elastomers, the kaolin, the carbon black, and any optional additives were added. The rotor speed was then increased to 65 RPM. One piston elevation was conducted at 95° C. to turn the mix over, and the mix was finally dropped out of the mixer at 120° C. The piston pressure was constant at 5 bars, and the rotor temperature was 55° C. Plaques were cured for mechanical properties testing using optimum cure conditions determined by a MDR rheometer at 150° C. The inner liner samples were then cut parallel to the flow of air, as described in the method above, and analyzed according to the above method. Results are shown in Table 1. MOCON testing was conducted twice for each sample using two separate samples of each formulation.

TABLE 1

| Kaolin | Performance (%) | Laser D | Overall Measures | | | Anisotropic Particle Measures | | MOCON1 | MOCON2 |
|---|---|---|---|---|---|---|---|---|---|
| | | | Mean AR | Mean Area | Mean Diameter | Mean Diameter | % w/ AR > 2 | | |
| Sample 1 | 138.86 | 3.2 | 1.72 | 0.49 | 0.79 | 0.93 | 33.84 | 139 | 126 |
| Sample 2 | 129.24 | 4 | 2.03 | 0.69 | 0.93 | 1.08 | 37.74 | 139 | 146 |
| Sample 3 | 127.98 | 3 | 2.02 | 0.8 | 1.01 | 1.23 | 41.57 | 142 | 145 |
| Sample 4 | 121.71 | 6.7 | 1.75 | 0.63 | 0.89 | 0.95 | 33.12 | 150 | 152 |
| Sample 5 | 120.12 | 6.7 | 1.92 | 0.63 | 0.89 | 1.02 | 39.92 | 154 | 152 |
| Sample 6 | 117.55 | 5.7 | 1.73 | 0.57 | 0.85 | 0.85 | 30.55 | 155 | 158 |
| Sample 7 | 112.72 | 3.2 | 1.79 | 0.49 | 0.79 | 0.84 | 27.65 | 163 | 163 |
| Sample 8 | 111.32 | 2.5 | 1.74 | 0.49 | 0.79 | 0.89 | 31.7 | 166 | 165 |
| Sample 9 | 112.04 | 1.5 | 1.46 | 0.32 | 0.64 | 0.62 | 18.29 | 168 | 160 |
| Sample 10 | 108.47 | 0.5 | 1.58 | 0.34 | 0.66 | 0.7 | 22.29 | 170 | 169 |
| Sample 11 | 105.87 | 0.4 | 1.39 | 0.33 | 0.64 | 0.71 | 15.29 | 174 | 173 |
| Pearson $R^2$ v. Performance | | 0.44 | 0.63 | 0.65 | 0.66 | 0.71 | 0.73 | | |

As shown in Table 1, very high aspect ratio (e.g. an aspect ratio of 3 or greater) is not necessary for improved performance. Instead, the samples that maintained a consistent size, with at least about 20% or more of the particles having an aspect ratio of greater than 2 (% w/AR>2), showed the greatest improvement in permeability.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An inner liner for an inflatable article comprising,
   a rubber component, wherein the rubber component comprises a butyl rubber and a nitrile rubber; and
   particles of a platy mineral having a mean aspect ratio of less than three, wherein at least about 33% or more of the platy mineral particles have an aspect ratio of 2 or greater.

2. The inner liner of claim 1, wherein the platy mineral comprises kaolin.

3. The inner liner of claim 1, wherein the particles of the platy mineral have a mean diameter of about 0.8 μm or greater and about 3 μm or less.

4. The inner liner of claim 3, wherein the particles of the platy mineral have a mean diameter of about 0.9 μm or greater and about 2 μm or less.

5. The inner liner of claim 1, wherein the particles of the platy mineral have a mean area of greater than about 0.4 μm².

6. The inner liner of claim 5, wherein the particles of the platy mineral have a mean area of greater than about 0.45 μm².

7. The inner liner of claim 1, wherein the rubber component is present in the inner liner in an amount of 100 parts per hundred rubber (phr), and wherein the particles of the platy mineral are present in an amount of about 10 to about 50 phr.

8. The inner liner of claim 1, wherein the inner liner further comprises at least one additive, preferably wherein the at least one additive includes carbon black.

9. The inner liner of claim 8, wherein the at least one additive is present in the inner liner in an amount of about 10 phr to about 60 phr.

10. The inner liner of claim 1, wherein the butyl rubber is present in the rubber composition in an amount of about 50 phr to about 100 phr and/or wherein the nitrile rubber is present in the rubber component in an amount of about 0 phr to about 50 phr.

11. The inner liner of claim 1, wherein the inner liner exhibits a MOCON value of about 165 or less.

12. A tire comprising an inner liner according to claim 1.

13. An inflatable article comprising:
   an inner liner that comprises a rubber component, wherein the rubber component comprises a butyl rubber and a nitrile rubber, and particles of a platy mineral having a mean aspect ratio of less than three, wherein at least about 33% or more of the platy mineral particles have an aspect ratio of 2 or greater.

14. The inflatable article of claim 13, wherein the platy mineral comprises kaolin.

15. The inflatable article of claim 13, wherein the particles of the platy mineral have a mean diameter of about 0.8 μm or greater and about 3 μm or less.

16. The inflatable article of claim 14, wherein the particles of the platy mineral have a mean diameter of about 0.9 μm or greater and about 2 μm or less.

17. The inflatable article of claim 13, wherein the particles of the platy mineral have a mean area of greater than about 0.4 μm².

18. The inflatable article of claim 13, wherein the particles of the platy mineral have a mean area of greater than about 0.45 μm².

\* \* \* \* \*